US011671969B2

(12) United States Patent
Liu et al.

(10) Patent No.: US 11,671,969 B2
(45) Date of Patent: Jun. 6, 2023

(54) CORRESPONDING CONFIGURATION FOR SIMULTANEOUS PHYSICAL UPLINK CONTROL CHANNEL PUCCH AND PHYSICAL UPLINK SHARED CHANNEL PUSCH TRANSMISSION

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 360 days.

(21) Appl. No.: 16/763,715

(22) PCT Filed: Nov. 8, 2018

(86) PCT No.: PCT/CN2018/114569
§ 371 (c)(1),
(2) Date: May 13, 2020

(87) PCT Pub. No.: WO2019/096059
PCT Pub. Date: May 23, 2019

(65) Prior Publication Data
US 2022/0248392 A1 Aug. 4, 2022

(30) Foreign Application Priority Data
Nov. 15, 2017 (WO) ................ PCT/CN2017/111126

(51) Int. Cl.
*H04W 72/21* (2023.01)
(52) U.S. Cl.
CPC .................... *H04W 72/21* (2023.01)
(58) Field of Classification Search
CPC . H04W 72/0413; H04W 52/34; H04W 76/20; H04W 52/365; H04W 52/325;
(Continued)

(56) References Cited

U.S. PATENT DOCUMENTS 8,681,627 B2 * 3/2014 Choudhury ........... H04W 24/10
370/235
10,630,433 B2 * 4/2020 Yang ..................... H04L 5/0057
(Continued)

FOREIGN PATENT DOCUMENTS

| CN | 103796318 A | 5/2014 |
| WO | 2016026066 A1 | 2/2016 |
| WO | 2016144910 A1 | 9/2016 |

OTHER PUBLICATIONS

Extended European Search Report dated Oct. 13, 2020 for European Patent Application No. 18877450.9, 13 pages.
(Continued)

*Primary Examiner* — Hanh N Nguyen
(74) *Attorney, Agent, or Firm* — Sage Patent Group

(57) ABSTRACT

The disclosure relates to a method implemented by a network device in a wireless communication network, the network device communicatively connected to at least a terminal device in the wireless communication network. The method comprises determining a corresponding configuration for simultaneous PUCCH and PUSCH transmission based on information associated with the terminal device; and transmitting a configuration signaling to the terminal device, wherein the configuration signaling carries the corresponding configuration for simultaneous PUCCH and PUSCH transmission and the configuration signaling is to be used to enable or disable simultaneous PUCCH and PUSCH transmission. The disclosure also relates to a network device performing said method.

12 Claims, 8 Drawing Sheets

(58) Field of Classification Search
CPC ........ H04W 72/21; H04L 1/18; H04L 1/1812;
H04L 5/00; H04L 5/0057; H04L 1/1848;
H04L 5/0094; H04L 5/0007; H04L 5/001;
H04L 5/0044; H04L 5/0053; H04L
5/0069; H04L 5/0091
See application file for complete search history.

(56) References Cited

U.S. PATENT DOCUMENTS

| | | | |
|---|---|---|---|
| 2010/0195575 A1 | 8/2010 | Papasakellariou et al. | |
| 2013/0077514 A1* | 3/2013 | Dinan | H04B 7/0634 370/252 |
| 2014/0192740 A1* | 7/2014 | Ekpenyong | H04L 5/0094 370/329 |
| 2016/0198421 A1* | 7/2016 | Yi | H04W 52/34 370/329 |
| 2016/0329993 A1* | 11/2016 | Kim | H04W 24/02 |
| 2017/0094612 A1 | 3/2017 | Dinan | |
| 2017/0311317 A1 | 10/2017 | Dinan | |
| 2018/0049047 A1* | 2/2018 | Lin | H04W 72/04 |
| 2020/0100194 A1* | 3/2020 | Nangia | H04W 72/0453 |

OTHER PUBLICATIONS

Qualcomm Inc., 3GPP TSG RAN WG1 #80bis, R1-151392, "PUCCH on SCell", Belgrade, Serbia, Apr. 20-Apr. 24, 2015, Agenda item 7.2.2.1, 5 pages.

International Search Report and Written Opinion of the International Searching Authority for PCT International Application No. PCT/CN2018/114569 dated Jan. 30, 2019.

Catt, "Discussion on the simultaneous transmissions of (s)PUCCH and (s)PUSCH," 3GPP TSG RAN WG1 Meeting #89, Hangzhou, P.R. China May 15-19, 2017, R1-1707443, 5 pages.

Catt, "Discussion on the simultaneous transmissions of (s)PUCCH and (s)PUSCH," 3GPP TSG RAN WG1 Meeting #88bis, Spokane, USA Apr. 3-7, 2017, R1-1704521, 5 pages.

* cited by examiner

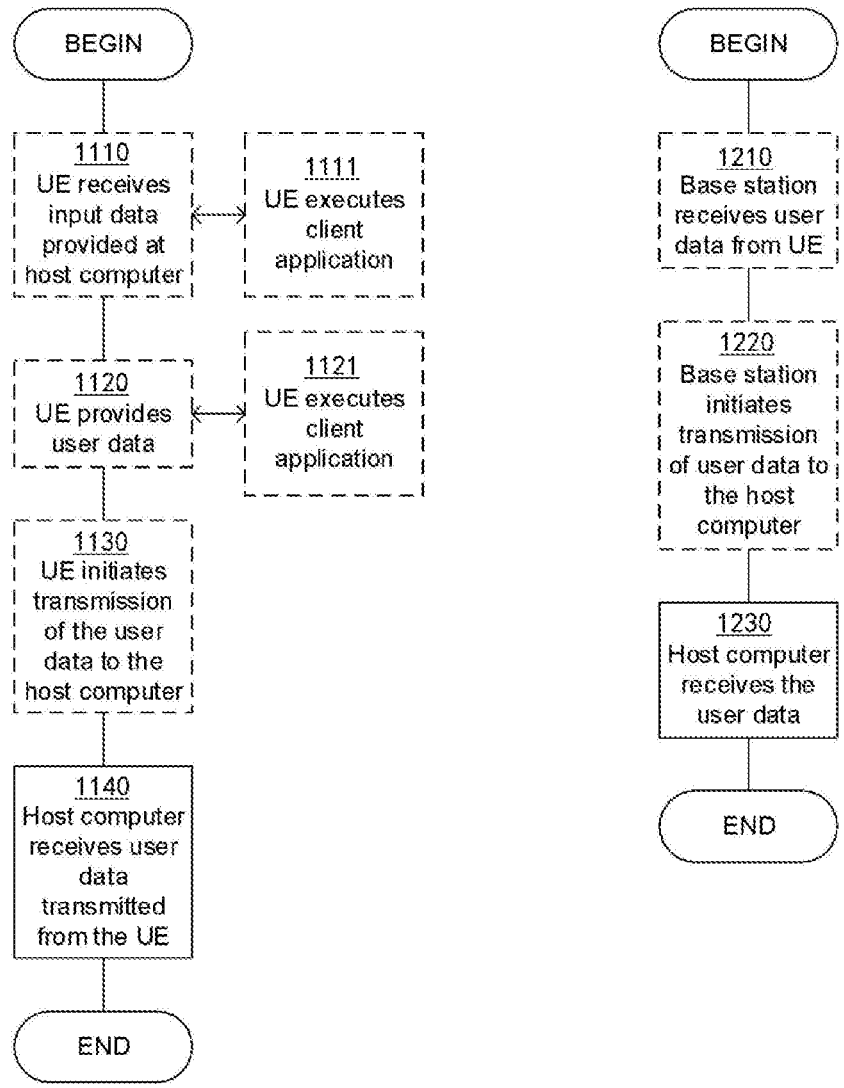

CORRESPONDING CONFIGURATION FOR SIMULTANEOUS PHYSICAL UPLINK CONTROL CHANNEL PUCCH AND PHYSICAL UPLINK SHARED CHANNEL PUSCH TRANSMISSION

TECHNICAL FIELD

Embodiments of the disclosure generally relate to the field of wireless communication and more specifically, to a method and device for corresponding configuration for simultaneous Physical Uplink Control Channel PUCCH and Physical Uplink Shared Channel PUSCH transmission in a communication network.

```
PUCCH-ConfigDedicated-v1020 ::=    SEQUENCE {
  pucch-Format-r10                 CHOICE {
  ...
  }                                                          OPTIONAL, --
  Need OR
  twoAntennaPortActivatedPUCCH-Format1a1b-r10   ENUMERATED {true}   OPTIONAL,   -- Need OR
  simultaneousPUCCH-PUSCH-r10                   ENUMERATED {true}   OPTIONAL,   -- Need OR
  n1PUCCH-AN-RepP1-r10                          INTEGER (0..2047)   OPTIONAL    -- Need OR
  }
```

BACKGROUND

Wireless communication networks are widely deployed to provide various communication services such as voice, video, packet data, messaging, broadcast, etc. These wireless networks may be multiple-access networks capable of supporting multiple Users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of terminal devices. A terminal device may communicate with a base station via the downlink and uplink. The downlink (or forward link) refers to the communication link from the base station to the terminal device, and the uplink (or reverse link) refers to the communication link from the terminal device to the base station.

With development of technology, in LTE, the feature of simultaneous PUCCH and PUSCH transmission is supported since Release 10 of 3GPP to meet differentiated delay/reliability requirements of PUSCH and PUCCH. For uplink control information (UCI) such as HARQ acknowledgement and the CSI report, the delay due to physical layer retransmission is not acceptable while it is acceptable for data in most cases. For HARQ A/N, the correspondence between the DL HARQ transmission corrupts and the HARQ A/N bits puts a strict timing requirement on the delivery of the HARQ A/N bits on the reverse link, if HARQ A/N is retransmitted over PUSCH when PUSCH transmission is failed, the information of HARQ A/N is assumed to be lost at the receiver side when the required timing for HARQ A/N delivery is elapsed. Similarly, the retransmission of CSI is meaningless since the CSI information would be outdated when it succeeds to transmit. Meanwhile, the application of simultaneous PUSCH and PUCCH is also beneficial to set independently the power level between control and data.

For differentiated delay/reliability requirements between UL data TX and UCI TX, it is not always feasible to multiplex UCI and UL data in PUSCH. Therefore, simultaneous PUCCH and PUSCH transmission was introduced. When simultaneous PUCCH and PUSCH transmissions is enabled, separate link adaptions can be applied for UL data TX and UCI TX, for instance, separate inner loop power control configurations and loops can be applied between UCI TX and UL data TX.

In LTE, the feature of simultaneous PUCCH and PUSCH TX is configured per MAC entity. The relevant RRC information elements are listed as below:

SUMMARY

The summary is provided to introduce a selection of concepts in a simplified form that are further described below in detailed description. This summary is not intended to identify key features or essential features of the claimed subject matter, nor is it intended to be used to limit the scope of the claimed subject matter.

Various aspects and features of the disclosure are described in further detail below.

According to a first aspect of the disclosure, there is provided a method implemented by a network device in a wireless communication network, the network device is communicatively connected to at least a terminal device in the wireless communication network. The method comprises determining a corresponding configuration for simultaneous PUCCH and PUSCH transmission based on information associated with the terminal device; transmitting a configuration signaling to the terminal device, wherein the configuration signaling carries the corresponding configuration for simultaneous PUCCH and PUSCH transmission and the configuration signaling is to be used to enable or disable simultaneous PUCCH and PUSCH transmission.

According to a second aspect of the disclosure, there is provided a method implemented by a terminal device in a wireless communication network. The terminal device is communicatively connected to at least a network device in the wireless communication network. The method comprises receiving a configuration signaling, wherein the configuration signaling carries a corresponding configuration for simultaneous Physical PUCCH and PUSCH transmission; enabling or disabling simultaneous PUCCH and PUSCH transmission according to the corresponding configuration; wherein the corresponding configuration is determined according to the method implemented by a network device in a wireless communication network.

According to a third aspect of the disclosure, there is provided a network device in a wireless communication network, the network device is communicatively connected to at least a terminal device in the wireless communication network. The network device comprises a processor; and a memory communicatively coupled to the processor and adapted to store instructions which, when executed by the processor, cause the network device to perform operations of determining a corresponding configuration for simultaneous PUCCH and PUSCH transmission based on information associated with the terminal device; transmitting a configuration signaling to the terminal device, wherein the configuration signaling carries the corresponding configuration for simultaneous PUCCH and PUSCH transmission and the configuration signaling is to be used to enable or disable simultaneous PUCCH and PUSCH transmission.

According to a fourth aspect of the disclosure, there is provided a terminal device in a wireless communication network. The terminal device is communicatively connected to at least a network device in the wireless communication network. The terminal device comprises a processor; and a memory communicatively coupled to the processor and adapted to store instructions which, when executed by the processor, cause the terminal device to perform operations of receiving a configuration signaling, wherein the configuration signaling carries a corresponding configuration for simultaneous PUCCH and PUSCH transmission; enabling or disabling simultaneous PUCCH and PUSCH transmission according to the corresponding configuration; wherein the corresponding configuration is determined according to the method implemented by a network device in a wireless communication network.

According to a fifth aspect of the disclosure, there is provided a wireless communication system comprising a network device according to the third aspect of the disclosure and a terminal device according to the fourth aspect of the disclosure.

According to a sixth aspect of the disclosure, there is provided a non-transitory computer readable medium having a computer program stored thereon which, when executed by a set of one or more processors of a network device, causes the network device to perform operations of the method implemented by a network device in a wireless communication network.

According to a seventh aspect of the disclosure, there is provided non-transitory computer readable medium having a computer program stored thereon which, when executed by a set of one or more processors of a terminal device, causes the terminal device to perform operations of the method implemented by a terminal device in a wireless communication network.

In an embodiment, information associated with the terminal device can be one or more of the information of a service of the terminal device, a logical channel or a logical channel group, a PUCCH cell, a PUCCH resource, a bandwidth part, a carrier, a frequency.

In an example, when information associated with the terminal device is a service of the terminal device, an indicator can be added to a signaling structure for simultaneous PUCCH and PUSCH transmission; wherein said indicator is indicative of simultaneous PUCCH and PUSCH transmission for said service of the terminal device.

In an example, when information associated with the terminal device is a logical channel or a logical channel group, an indicator can be added to a signaling structure for logical channel configuration, wherein said indicator is indicative of simultaneous PUCCH and PUSCH transmission for the logical channel or logical channel group.

In an example, when information associated with the terminal device is a logical channel or a logical channel group, a bitmap can be added to a signaling structure for simultaneous PUCCH and PUSCH transmission; wherein said bitmap is used to indicate which of logical channels or logical channel group is configured to use simultaneous PUCCH and PUSCH transmission.

In another example, size of said bitmap depends on the number of logical channels configured at maximum for the terminal device.

In an example, when information associated with the terminal device is a logical channel or a logical channel group, an indicator can be added to a signaling structure for Medial Access Control Element MAC CE; wherein said indicator is used to indicate which logical channel(s) is configured to use simultaneous PUCCH and PUSCH transmission.

In an example, when information associated with the terminal device is a carrier, simultaneous PUCCH and PUSCH transmission can be configured for said carrier.

In an example, when information associated with the terminal device is a bandwidth part, a signaling structure for simultaneous PUCCH and PUSCH transmission can be configured for said bandwidth part.

In an example, said service of the terminal device can be one of ultra-reliable and low latency communication (URLLC), enhanced mobile broadband (eMBB), massive machine type communication (mMTC).

In an example, when different services of the terminal device use different carriers, simultaneous PUCCH and PUSCH transmission can be enabled for one of different carriers and/or can be disabled for another of different carriers.

In an example, when different services of the terminal device use different bandwidth parts, simultaneous PUCCH and PUSCH transmission can be enabled for one of different bandwidth parts and/or can be disabled for another of different bandwidth parts.

According to another aspect of the disclosure, there is provided a method for reporting type 2 power headroom of a terminal device. The method comprises determining whether at least one logical channel supports simultaneous PUCCH and PUSCH transmission; reporting type 2 power headroom of the terminal device based on said determining.

In an example, simultaneous PUCCH and PUSCH transmission can be further configured to have a corresponding configuration according to the method implemented by a network device in a wireless communication network.

According to yet another aspect of the disclosure, there is provided a terminal device in a wireless communication network. The terminal device is communicatively connected to at least a network device in the wireless communication network. The terminal device comprises a processor; and a memory communicatively coupled to the processor and adapted to store instructions which, when executed by the processor, cause the terminal device to perform a method of a method for reporting type 2 power headroom of a terminal device.

According to yet another aspect of the disclosure, there is provided a non-transitory computer readable medium having a computer program stored thereon which, when executed by a set of one or more processors of a terminal device, causes the terminal device to perform operations of the method for reporting type 2 power headroom of a terminal device.

According to the disclosure, simultaneous PUCCH and PUSCH transmission can be configured per service, or logical channel or logical channel group, per PUCCH cell, PUCCH resource or Bandwidth part, thus different UCI delay or reliability can be achieved for different services and the radio resource efficiency can be improved.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 11 is a flowchart illustrating a method implemented in a communication system in accordance with one embodiment; and FIG. 12 is a flowchart illustrating a method implemented in a communication system in accordance with one embodiment.

DESCRIPTION OF EMBODIMENTS

Figure 1:
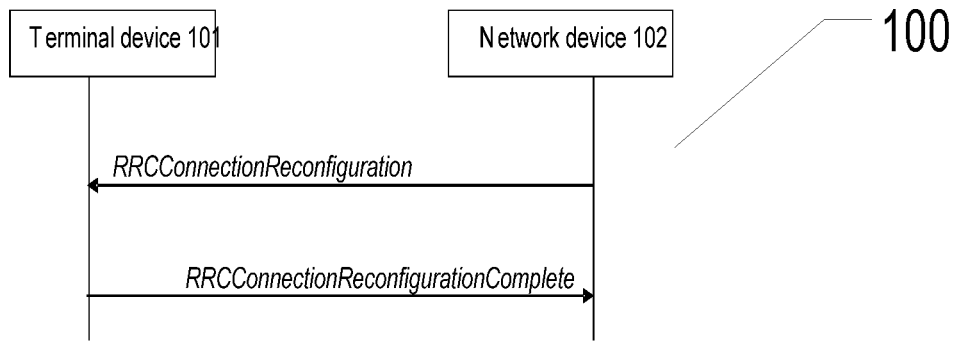
FIG. 1 illustrates a general RRC connection configuration signaling flow 100 between a terminal device 101 and a network device 102 accordance with embodiments of the present disclosure.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

References in the specification to "one embodiment", "an embodiment", "an example embodiment" etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "device" refers to a network device or a terminal device in a wireless communication network.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, terminal device, or other suitable device. The terminal device may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an Internet of Things (IOT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

As used herein, the singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on".

Now some exemplary embodiments of the present disclosure will be described below with reference to the figures. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of or one or more physical network interfaces to establish network connections (to transmit and/or receive code and/or data using propagating signals) with other electronic devices. One or more parts of an embodiment of the present disclosure may be implemented using different combinations of software, firmware, and/or hardware.

The following description describes method and apparatus for performing corresponding configuration for simultaneous PUCCH and PUSCH transmission in a communication network. The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description blow.

For New Radio, NR or 5G, it is supposed to support multiple types of services within a common RAN including such as enhanced mobile broadband (eMBB), massive machine type communication (mMTC) and ultra-reliable and low latency communication (URLLC) etc. These services have different QoS requirements in terms of delay, data rate and packet loss. URLLC requires low delay and/or high reliability, but usually it also has a low data rate and a sparse data transmission interval;

mMTC typically requires long battery lifetime but does not require low delay or high data rate, often combined with small infrequent packets;

eMBB requires high data rate. Delay can be strict but typically less strict than in URLLC.

Since different services may have different QoS requirements for a terminal device, the delay/reliability requirements of UCI transmission corresponding to different services can be very different.

The existing LTE feature of simultaneous PUCCH and PUSCH transmission is configured per MAC entity without consideration of the service type. In this way, a terminal device would either enable this feature for all services at the same time, or not use it at all, regardless of how many services are active. In other words, it is not possible to only apply the feature for a subset of the services that can really benefit from this feature, while at the same time, the other services don't apply this feature.

The services may have different UCI delay and/or reliability requirements, the application of simultaneous PUCCH and PUSCH transmission for all services may results in system performance loss. In one example, a terminal device supports both URLLC and eMBB services, where UCI TX for URLLC requires extremely low or tight delay and/or extremely high reliability and the UCI TX for eMBB may does not require so tight delay or extremely high reliability.

If simultaneous PUCCH and PUSCH transmission is enabled as LTE, simultaneous PUCCH and PUSCH transmission is also enabled for eMBB, which may negatively impact on the PUCCH capacity. While at the same time, the transmission of UCI together with the data on PUSCH is sufficient given the fact that eMBB has more relaxed latency requirements.

If simultaneous PUCCH and PUSCH transmission is disabled as LTE, simultaneous PUCCH and PUSCH transmission is also disabled for URLLC, which means the extremely tight delay and high reliability of UCI for URLLC cannot be well met since the physical layer retransmission would bring an inevitable delay components.

In view of the existing technologies, there is a need for performing corresponding configuration for simultaneous Physical Uplink Control Channel PUCCH and Physical Uplink Shared Channel PUSCH transmission for a terminal device in a communication network.

In order to solve the above and other potential problems, embodiments of the present disclosure provide solutions for corresponding configuration of simultaneous PUCCH and PUSCH TX per MAC entity for supporting multiple services for a terminal device. For a MAC entity of a terminal device, simultaneous PUCCH and PUSCH transmission can be configured per service, or logical channel or logical channel group, per PUCCH cell, PUCCH resource or Bandwidth part.

FIG. 1 illustrates a general RRC connection configuration signaling flow 100 between a terminal device 101 and a network device 102 accordance with embodiments of the present disclosure. Before transmitting RRC connection configuration message to terminal device 101, the base station 102 first determines a corresponding configuration for simultaneous PUCCH and PUSCH transmission based on information associated with the terminal device 101. The configuration signaling carries the corresponding configuration for simultaneous PUCCH and PUSCH transmission and the configuration signaling is to be used to enable or disable simultaneous PUCCH and PUSCH transmission.

Figure 2:
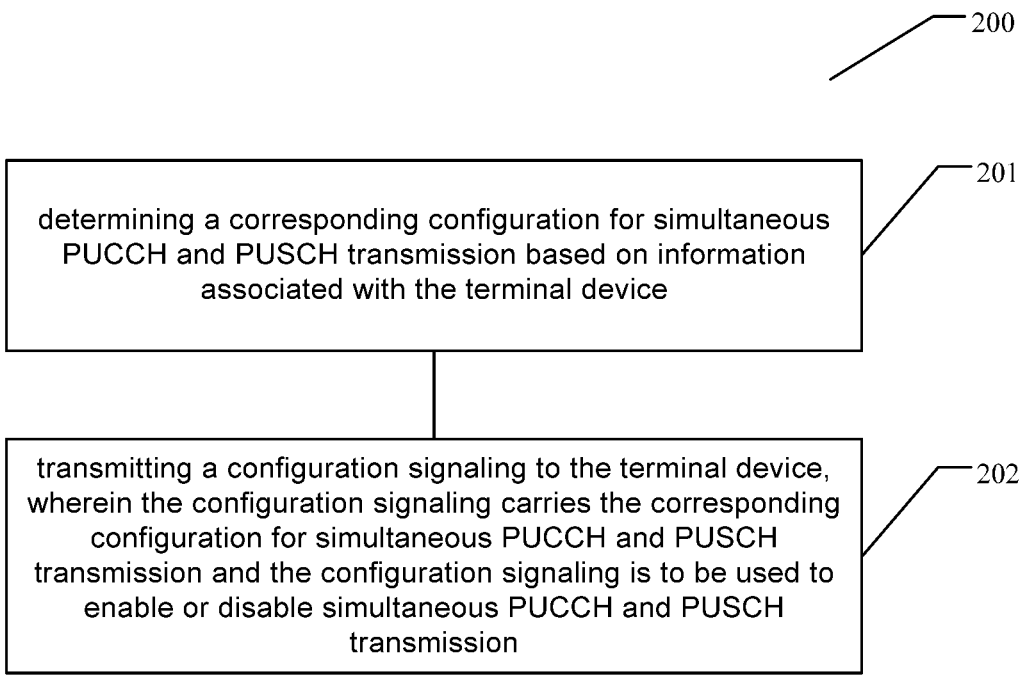
FIG. 2 illustrates a flowchart of a method 200 implemented by a network device in a wireless communication network in accordance with embodiments of the present disclosure.

FIG. 2 illustrates a flowchart of a method 200 implemented by a network device 102 in a wireless communication network in accordance with embodiments of the present disclosure. With the method, the above and other potential deficiencies in the conventional approaches can be overcome. It would be appreciated by those skilled in the art that the method may be implemented by a network device. The method is entered at block 210, where the network device 102 determines a corresponding configuration for simultaneous PUCCH and PUSCH transmission based on information associated with the terminal device. Information associated with the terminal device 101 will be introduced in detail below. Then, at block 202 the network device 102 transmits a configuration signaling to the terminal device 101, wherein the configuration signaling carries the corresponding configuration for simultaneous PUCCH and PUSCH transmission and the configuration signaling is to be used to enable or disable simultaneous PUCCH and PUSCH transmission.

According to the disclosure, information associated with the terminal device can be one or more of the information of a service of the terminal device, a logical channel or a logical channel group, a PUCCH cell, a PUCCH resource, a bandwidth part, a carrier, a frequency. The information of a service of the terminal device could be service specific configuration.

In a first embodiment, for a terminal device, the feature of simultaneous PUCCH and PUSCH transmission is configured per service, logic channel (LCH) or logical channel group (LCG). In one example, for a terminal device with both URLLC service and eMBB service active at the same time, the network can configure two separate configurations of simultaneous PUCCH and PUSCH TX for this terminal device, and one is used to configure URLLC service and another one is used to configure eMBB service. Each configuration indicates if the associated service, LCH or LCG can apply the simultaneous transmission of PUCCH and PUSCH. The network can enable simultaneous PUCCH and PUSCH TX for URLLC service to ensure the tight delay and high reliability of UCI TX for URLLC while disabling simultaneous PUCCH and PUSCH TX for eMBB service for resource efficiency purpose.

The RRC signaling carries the configuration of the feature of simultaneous PUCCH and PUSCH transmission for each logical channel/logical channel group. The signaling alternatives can be implemented in several ways. We give several examples to clarify how the signaling is formulated in RRC.

For a first example, the new indicators if LCHs/LCGs support simultaneous transmission of PUCCH and PUSCH, are added to the PUCCH configuration structure. In the below example, we have only added two indicators for URLLC and eMBB separately. In principle, we can add more indicators for all LCHs, and each indicator is for one LCH. If there are multiple PUCCH configurations signaled to a terminal device (each configuration may be associated with a separate carrier, or a BWP), the new indicators will be added to all PUCCH configurations, and each PUCCH configuration contains the indicators for the LCHs that are associated with this PUCCH configuration.

Example 1 below indicates separate enabler fields for eMBB and URLLC

```
PUCCH-ConfigDedicated ::=        SEQUENCE {
    pucch-Format                 CHOICE {
    ...
    }                                                        OPTIONAL,    -- Need OR
    twoAntennaPortActivatedPUCCH-Format1a1b-r10    ENUMERATED {true}   OPTIONAL,    -- Need OR
    simultaneousPUCCH-PUSCH-URLLC                  BOOLEAN   OPTIONAL ,    -- Need OR
    simultaneousPUCCH-PUSCH-eMBB                      BOOLEAN      OPTIONAL,  --   -- Need OR
    n1PUCCH-AN-RepP1-r10                           INTEGER (0..2047)       OPTIONAL     -- Need OR
}
```

For the above example, when information associated with the terminal device is a service of the terminal device, at block 201, the network device determines a corresponding configuration for simultaneous PUCCH and PUSCH transmission based on a service of the terminal device. As an embodiment the network device adds an indicator to a configuration signaling structure for simultaneous PUCCH and PUSCH transmission; wherein said indicator is indicative of said service of the terminal device; wherein said indicator is indicative of simultaneous PUCCH and PUSCH transmission for said service of the terminal device. In an example, the configuration signaling can be a RRC signaling.

Further, when information associated with the terminal device is a logical channel or a logical channel group, at block 201, the network device determines a corresponding configuration for simultaneous PUCCH and PUSCH transmission based on a logical channel or a logical channel group. As an embodiment, the network device adds an indicator to a configuration signaling structure for logical channel configuration, wherein said indicator is indicative of simultaneous PUCCH and PUSCH transmission for the logical channel or logical channel group. In an example, the configuration signaling can be a RRC signaling.

In a second example, instead of the indicators, a bitmap is used to indicate which LCHs is configured to use simultaneous transmission of PUCCH and PUSCH. In the bitmap, each bit corresponds to a LCH or a LCG, and the position of the bit matches the index or priority of a LCH, or LCG. In this example, the bitmap has a size of 8 bits, the actual size may be different, which depends on how many LCHs are configured at maximum for a terminal device. A bitmap may be also included in a MAC CE to indicate which logical channel/LCG supports simultaneous transmission of PUCCH and PUSCH. For MAC CE, the size of the bitmap may be larger than that is carried in RRC, due to the byte alignment purpose.

```
PUCCH-ConfigDedicated ::=        SEQUENCE {
    pucch-Format                 CHOICE {
    ...
    }                                                                OPTIONAL,-- Need OR
    twoAntennaPortActivatedPUCCH-Format1a1b-r10    ENUMERATED {true}           OPTIONAL,    -- Need OR
    simultaneousPUCCHPUSCHConfig-                  BIT STRING (SIZE(8))
    n1PUCCH-AN-RepP1-r10                           INTEGER (0..2047)           OPTIONAL    -- Need OR
}
```

For this example, when information associated with the terminal device is a logical channel or a logical channel group, at block 201, the network device determines a corresponding configuration for simultaneous PUCCH and PUSCH transmission based on information associated with the terminal device. As an embodiment, the network device adds a bitmap to a RRC signaling structure for simultaneous PUCCH and PUSCH transmission; wherein said bitmap is used to indicate which of logical channel(s) or logical channel group is configured to use simultaneous PUCCH and PUSCH transmission.

In another example, a new indicator can be added to the logical channel configuration structure.

```
LogicalChannelConfig ::= SEQUENCE {
    ul-SpecificParameters SEQUENCE {
    priority INTEGER (1..16),
    prioritisedBitRate ENUMERATED {
    kBps0, kBps8, kBps16, kBps32, kBps64, kBps128,
    kBps256, infinity, kBps512-v1020, kBps1024-v1020,
    kBps2048-v1020, spare5, spare4, spare3, spare2,
    spare1 },
    bucketSizeDuration ENUMERATED {
    ms50, ms100, ms150, ms300, ms500, ms1000, spare2,
    spare1 },
    logicalChannelGroup INTEGER (0..3) OPTIONAL -- Need OR
    } OPTIONAL, -- Cond UL
                    ...,
    [[ logicalChannelSR-Mask-r9 ENUMERATED {setup} OPTIONAL -- Cond SRmask
    ]],
    [[ logicalChannelSR-Prohibit-r12 BOOLEAN OPTIONAL -- Need ON
    ]]
    SimultaneousPUCCHPUSCHConfig             BOOLEAN
}
```

For this example, when information associated with the terminal device is a logical channel or a logical channel group, at block 201, the network device determines a corresponding configuration for simultaneous PUCCH and PUSCH transmission based on a logical channel or a logical channel group. As an embodiment, the network device adds an indicator to a signaling structure for Medial Access Control Element MAC CE; wherein said indicator is used to indicate which of logical channel(s) is configured to use simultaneous PUCCH and PUSCH transmission. In an example, the signaling structure can be RRC signaling structure.

In a second embodiment, considering that different service can be served in different carriers when more than one PUCCH carrier are configured, there can be multiple configurations of simultaneous PUCCH and PUSCH transmission, wherein each configuration configures the simultaneous PUCCH and PUSCH transmission for a PUCCH carrier. For instance, a terminal device has URLLC service in a narrow carrier of low frequency while at the same time eMBB service at a wide carrier of high frequency and PUCCH are transmitted in the same carrier as PDSCH, then simultaneous PUCCH and PUSCH transmission can be enabled for the narrow carrier of low frequency and/or disabled for the wide carrier of high frequency via respective configurations.

In a third embodiment, considering that different service can be served in different bandwidth parts (BWPs) in the same carrier and there are separate PUCCH resources for different BWPs, there can be multiple configurations of simultaneous PUCCH and PUSCH transmission, wherein each configuration configures the simultaneous PUCCH and PUSCH transmissions for a BWP. For instance, a terminal device has URLLC served by BWP1 while at the same time eMBB service served by BWP2 in the same carrier, then simultaneous PUCCH and PUSCH transmission can be enabled for the BWP1 and/or disabled for BWP2 via respective configurations.

According to the above embodiments involved in FIG. 2, different UCI delay or reliability can be achieved for different services and the radio resource efficiency can be improved.

Figure 3:
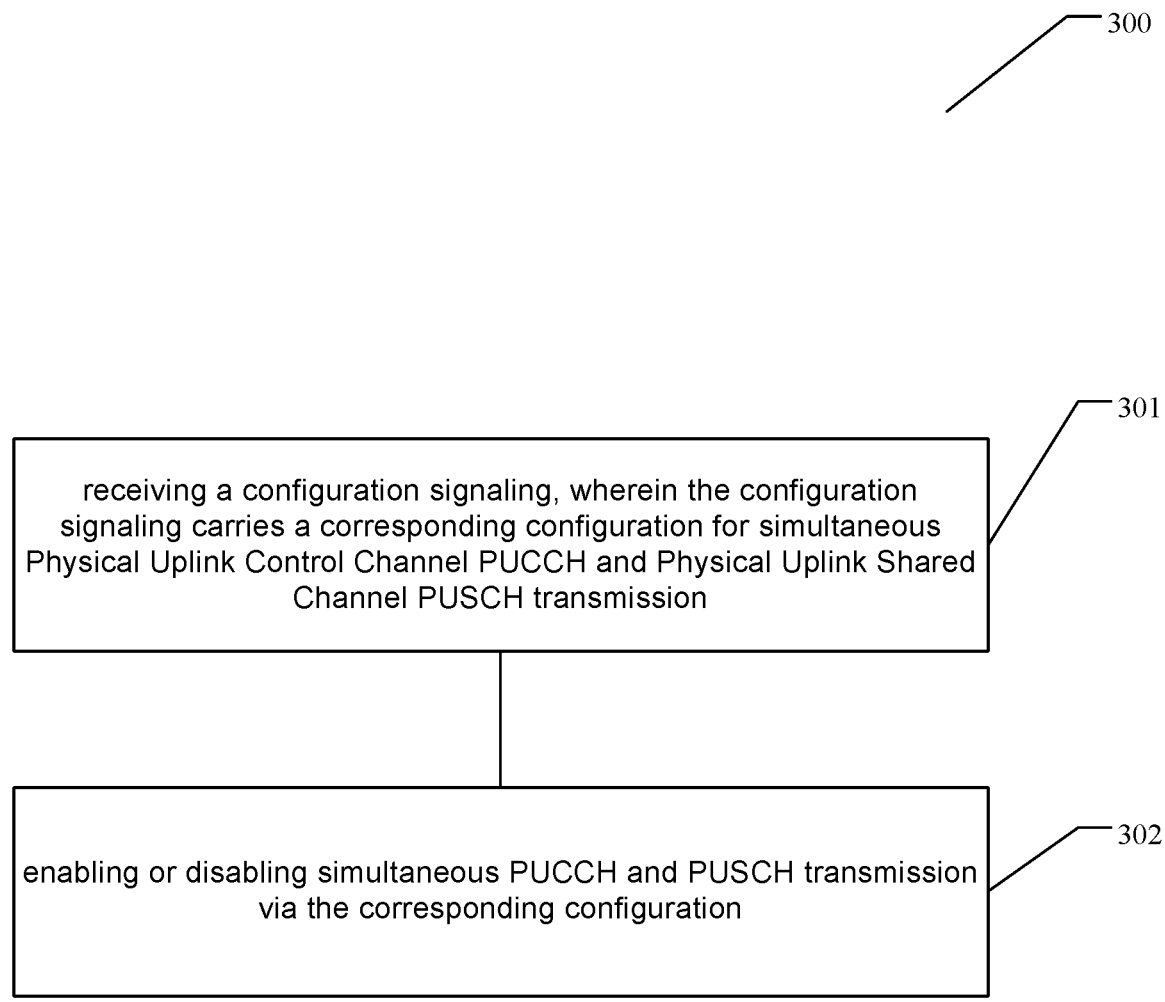
FIG. 3 illustrates a flowchart of a method 300 implemented by a terminal device in a wireless communication network in accordance with embodiments of the present disclosure.

FIG. 3 illustrates a flowchart of a method 300 implemented by a terminal device in a wireless communication network in accordance with embodiments of the present disclosure. Said method is entered at block 301. At block 301, the terminal device receives a configuration signaling, wherein the configuration signaling carries corresponding configuration for simultaneous PUCCH and PUSCH transmission. In an example, the configuration signaling can be a RRC signaling. Later, said method 300 continues to block 302. At block 302, the terminal device enables or disables simultaneous PUCCH and PUSCH transmission according to the corresponding configuration. The corresponding configuration is determined based on information associated with the terminal device at block 201 of FIG. 2. In an embodiment, information associated with the terminal device can be one or more of the information of a service of the terminal device, a logical channel or a logical channel group, a PUCCH cell, a PUCCH resource, a bandwidth part, a carrier, a frequency. In an embodiment, when information associated with the terminal device is a service of the terminal device, the corresponding configuration comprises adding an indicator to a signaling structure for simultaneous PUCCH and PUSCH transmission; wherein said indicator is indicative of simultaneous PUCCH and PUSCH transmission for said service of the terminal device. In an embodiment, when information associated with the terminal device is a logical channel or a logical channel group, the corresponding configuration comprises adding an indicator to a signaling structure for logical channel configuration, wherein said indicator is indicative of simultaneous PUCCH and PUSCH transmission for the logical channel or the logical channel group. In an embodiment, when information associated with the terminal device is a logical channel or a logical channel group, the corresponding configuration comprises adding a bitmap to a signaling structure for simultaneous PUCCH and PUSCH transmission; wherein said bitmap is used to indicate which logical channel(s) or logical channel group is configured to use simultaneous PUCCH and PUSCH transmission. As an embodiment, size of said bitmap depends on the number of logical channels configured at maximum for the terminal device. In an embodiment, when information associated with the terminal device is a logical channel or a logical channel group, the corresponding configuration comprises adding an indicator to a signaling structure for Medial Access Control Element MAC CE; wherein said indicator is used to indicate which logical channel(s) is configured to use simultaneous PUCCH and PUSCH transmission. In an embodiment, when information associated with the terminal device is a carrier, the corresponding configuration comprises configuring simultaneous PUCCH and PUSCH transmission for said carrier. In an embodiment, when information associated with the terminal device is a bandwidth part, the corresponding configuration comprises configuring simultaneous PUCCH and PUSCH transmission for said bandwidth part. In an embodiment, said service can be one of ultra-reliable and low latency communication (URLLC), enhanced mobile broadband (eMBB), massive machine type communication (mMTC). In an embodiment, when different services of the terminal device use different carriers, simultaneous PUCCH and PPUSCH transmission can be enabled for one of the different carriers and/or can be disabled for another of the different carriers. In an embodiment, when different services of the terminal device use different bandwidth parts, simultaneous PUCCH and PUSCH transmission can be enabled for one of the different bandwidth parts and/or can be disabled for another of the different bandwidth parts.

According to the above embodiments involved in FIG. 3, different UCI delay or reliability can be achieved for different services and the radio resource efficiency can be improved.

Figure 4:
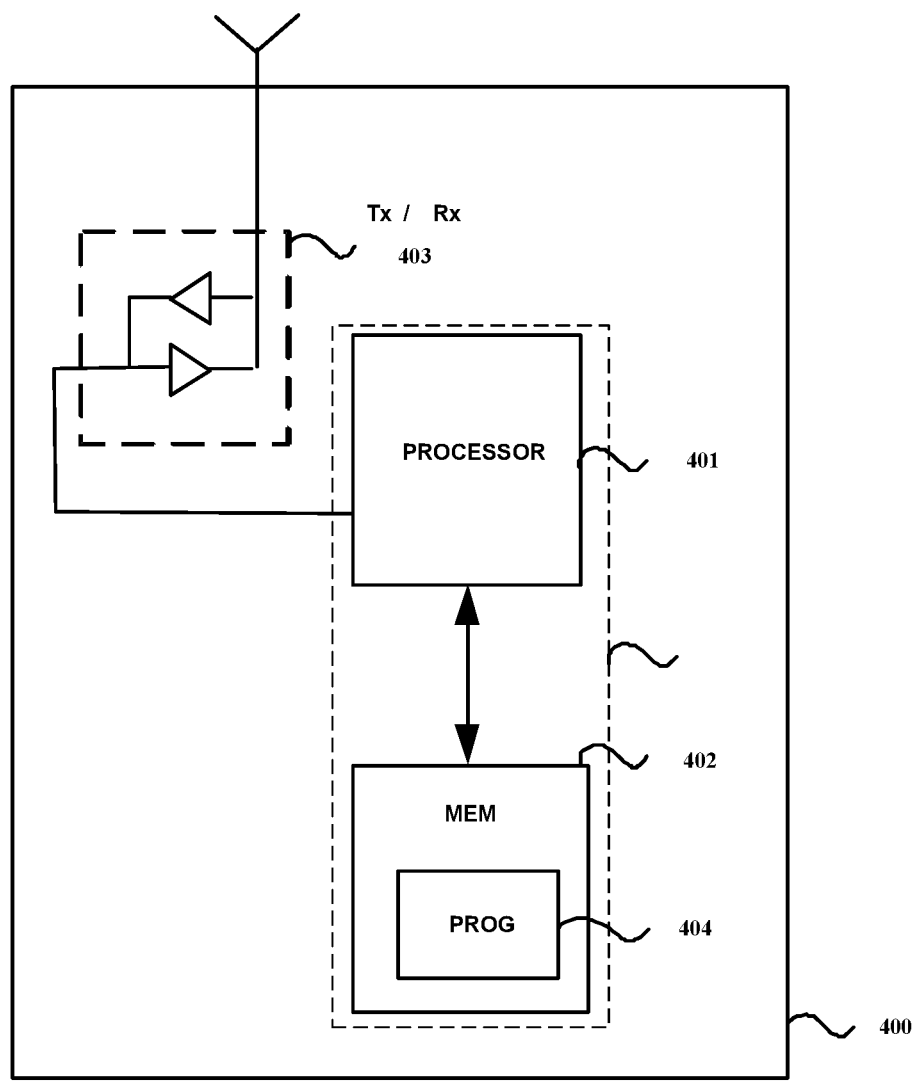
FIG. 4 illustrates a block diagram of a network device 400 in accordance with embodiments of the present disclosure.

FIG. 4 illustrates a block diagram of a network device 400 in accordance with embodiments of the present disclosure. A network device 400 is to perform corresponding configuration for simultaneous PUCCH and PUSCH transmission for a terminal device in a communication network. In additional to Tx/Rx 403, the network device 400 also comprises a processor 401 and a memory 402. The memory 402 is communicatively coupled to the processor 401 and adapted to store instructions or program 404 which, when executed by the processor 401, cause the network device 400 to perform operations of determining a corresponding configuration for simultaneous PUCCH and PUSCH transmission based on information associated with the terminal device; transmitting a configuration signaling to the terminal device, wherein the configuration signaling carries the corresponding configuration for simultaneous PUCCH and PUSCH transmission and the configuration signaling is to be used to enable or disable simultaneous PUCCH and PUSCH transmission.

In an example, information associated with the terminal device can be one or more of the information of a service of the terminal device, a logical channel or a logical channel group, a PUCCH cell, a PUCCH resource, a bandwidth part, a carrier, a frequency.

In an example, when information associated with the terminal device is a service of the terminal device, the memory 402 is adapted to store instructions or program 404 which, when executed by the processor 401, cause the network device 400 to further add an indicator to a signaling structure for simultaneous PUCCH and PUSCH transmission; wherein said indicator is indicative of simultaneous PUCCH and PUSCH transmission for said service of the terminal device. In an example, the signaling structure can be a RRC signaling structure.

In an example, when information associated with the terminal device is a logical channel or a logical channel group, the memory 402 is adapted to store instructions or program 404 which, when executed by the processor 401, cause the network device 400 to add an indicator to a signaling structure for logical channel configuration, wherein said indicator is indicative of simultaneous PUCCH and PUSCH transmission for the logical channel or logical channel group. In an example, the signaling structure can be a RRC signaling structure.

In an example, when information associated with the terminal device is a logical channel or a logical channel group, the memory 402 is adapted to store instructions or program 404 which, when executed by the processor 401, cause the network device 400 to add a bitmap to a signaling structure for simultaneous PUCCH and PUSCH transmission; wherein said bitmap is used to indicate which of logical channels or logical channel groups is configured to use simultaneous PUCCH and PUSCH transmission. In an example, the signaling structure can be a RRC signaling structure.

In an example, when information associated with the terminal device is a logical channel or logical channel group, the memory 402 is adapted to store instructions or program 404 which, when executed by the processor 401, cause the network device 400 to add an indicator to a signaling structure for Medial Access Control Element MAC CE; wherein said indicator is used to indicate which of logical channels is configured to use simultaneous PUCCH and PUSCH transmission. In an example, the signaling structure can be a RRC signaling structure.

In an example, when information associated with the terminal device is a carrier, the memory 402 is adapted to store instructions or program 404 which, when executed by the processor 401, cause the network device 400 to configure simultaneous PUCCH and PUSCH transmission for said carrier.

In an example, when information associated with the terminal device is a bandwidth part, the memory 402 is adapted to store instructions or program 404 which, when executed by the processor 401, cause the network device 400 to configure a signaling structure for simultaneous PUCCH and PUSCH transmission for said bandwidth part. In an example, the signaling structure can be a RRC signaling structure.

In an example, services of the terminal device can be one of ultra-reliable and low latency communication (URLLC), enhanced mobile broadband (eMBB), massive machine type communication (mMTC).

In an example, when different services of the terminal device use different carriers, simultaneous PUCCH and PUSCH transmission can be enabled for one of different carriers and/or can be disabled for another of different carriers.

In an example, when different services of the terminal device use different bandwidth parts, simultaneous PUCCH and PUSCH transmission can be enabled for one of different bandwidth parts and/or can be disabled for another of different bandwidth parts.

According to the above embodiments involved in FIG. 4, different UCI delay or reliability can be achieved for different services and the radio resource efficiency can be improved.

Figure 5:
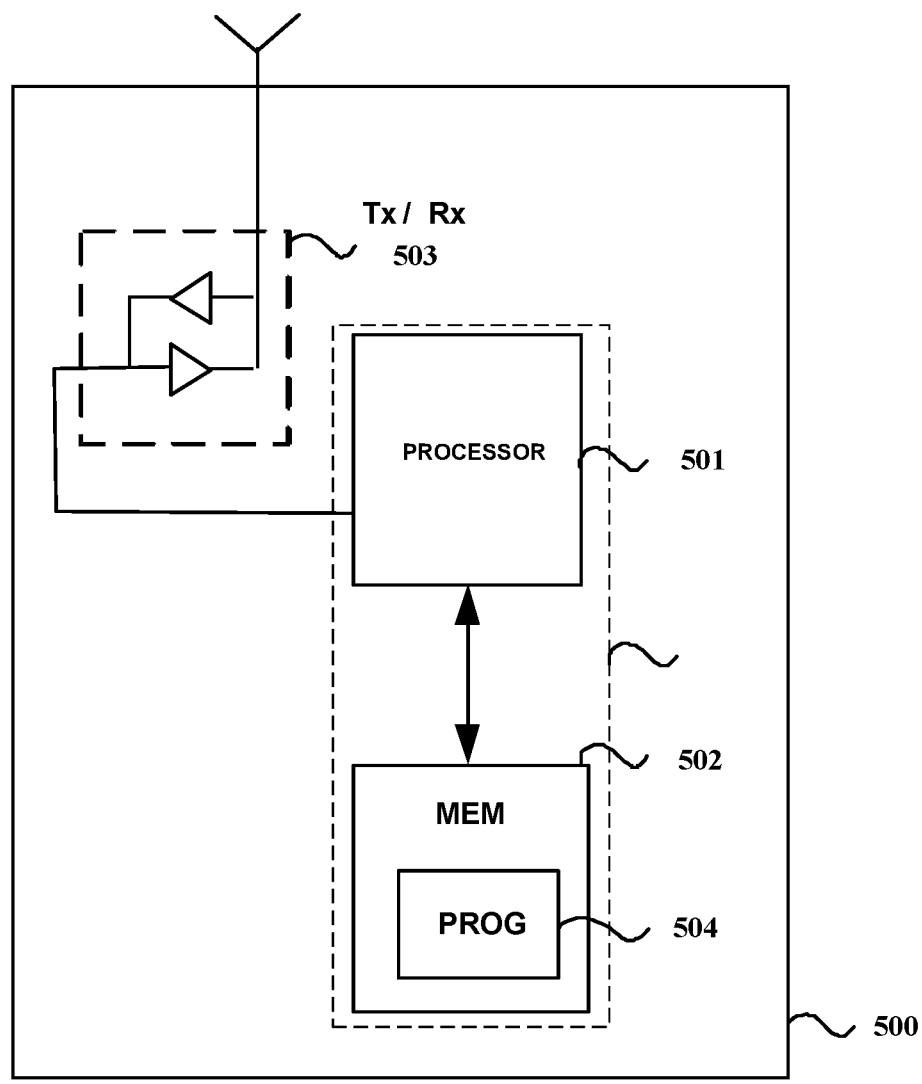
FIG. 5 illustrates a block diagram of a terminal device 500 in accordance with embodiments of the present disclosure.

FIG. 5 illustrates a block diagram of a terminal device 500 in accordance with embodiments of the present disclosure. A terminal device 500 is to implement corresponding configuration for simultaneous PUCCH and PUSCH transmission. In additional to Tx/Rx 503, the terminal device 500 also comprises a processor 501; and a memory 502 communicatively coupled to the processor and adapted to store instructions or program 504 which, when executed by the processor 501, cause the terminal device 500 to perform operations of: receiving a configuration signaling, wherein the configuration signaling carries a corresponding configuration for simultaneous PUCCH and PUSCH transmission; enabling or disabling simultaneous PUCCH and PUSCH transmission according to the corresponding configuration. The corresponding configuration is performed based on information associated with the terminal device by block 201.

According to the above embodiments involved in FIG. 5, different UCI delay or reliability can be achieved for different services and the radio resource efficiency can be improved.

Figure 6:
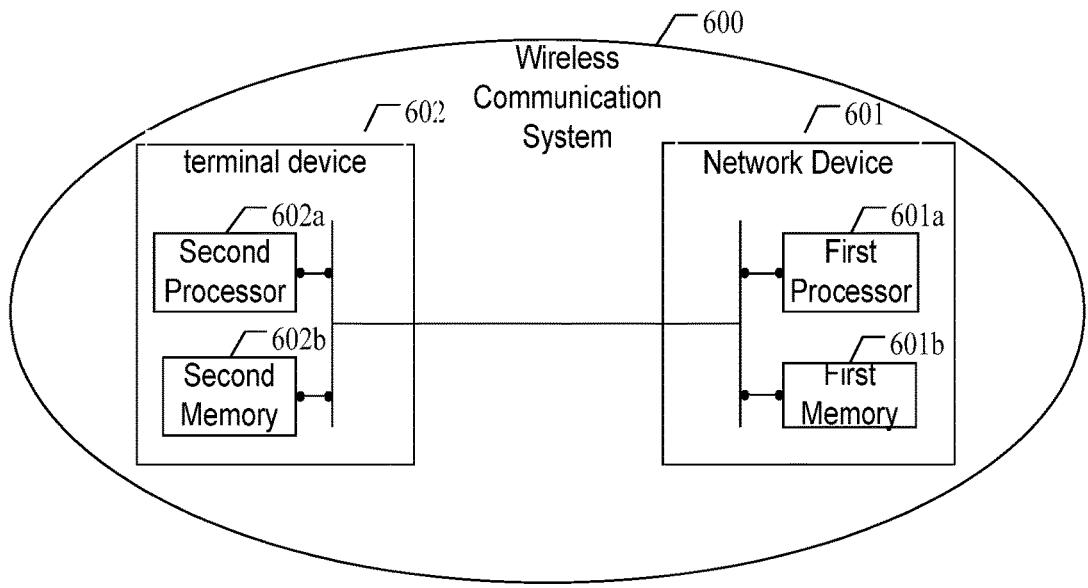
FIG. 6 illustrates a block diagram of a wireless communication system 600 in accordance with embodiments of the present disclosure.

FIG. 6 illustrates a block diagram of a wireless communication system 600 in accordance with embodiments of the present disclosure. A wireless communication system 600 comprises at least a network device 601 and a terminal device 602 communicatively connected to each other. The network device 601 comprises a first processor 601a; and a first memory 601b communicatively coupled to the first processor 601a and adapted to store instructions or program which, when executed by the first processor 601a, cause the network device 601 to perform operations of determining a corresponding configuration for simultaneous PUCCH and PUSCH transmission based on information associated with the terminal device 602; transmitting a configuration signaling to the terminal device 602, wherein the configuration signaling carries the corresponding configuration for simultaneous PUCCH and PUSCH transmission and the configuration signaling is to be used to enable or disable simultaneous PUCCH and PUSCH transmission. Further, the terminal device 602 comprises a second processor 602a; and a second memory 602b communicatively coupled to the second processor and adapted to store instructions or program which, when executed by the second processor 602a, cause the terminal device 602 to perform operations of receiving a configuration signaling, wherein the configuration signaling carries a corresponding configuration for simultaneous PUCCH and PUSCH transmission; enabling or disabling simultaneous PUCCH and PUSCH transmission according to the corresponding configuration; wherein the corresponding configuration is determined according to the method implemented by a network device shown in FIG. 2.

Figure 7:
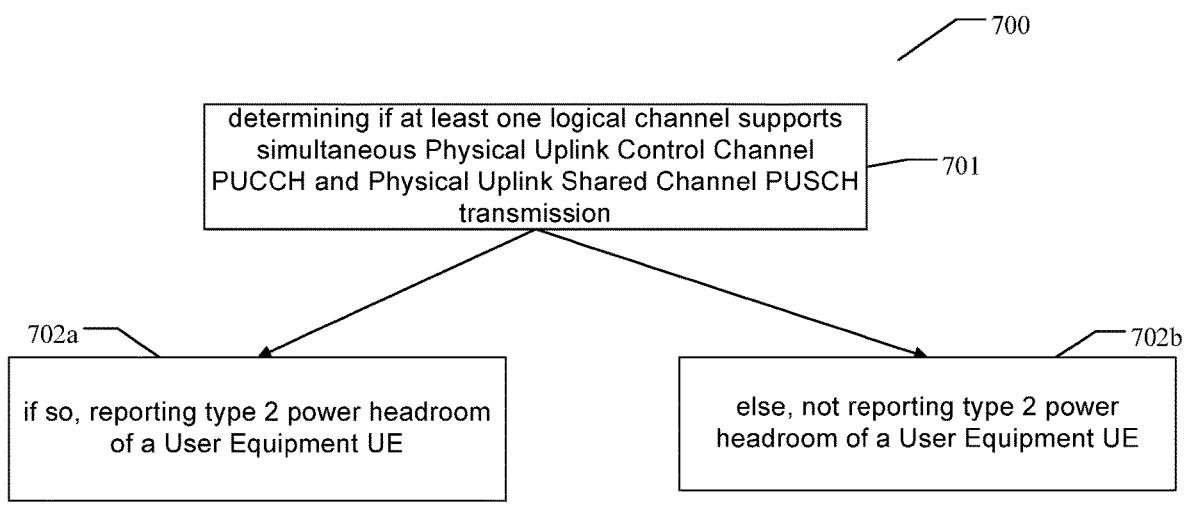
FIG. 7 illustrates a flowchart of a method 700 for reporting type 2power headroom of a terminal device in accordance with embodiments of the present disclosure.

FIG. 7 illustrates a flowchart of a method 700 for reporting type 2 power headroom of a terminal device in accordance with embodiments of the present disclosure.

In an embodiment, the configuration on whether or not to report type 2 PHR for a terminal device, is depending on the configuration of simultaneous transmission of PUCCH and PUSCH. If at least one LCH is configured to support the simultaneous transmission of PUCCH and PUSCH, the Type 2 PHR for the terminal device will be enabled, otherwise, it will be disabled.

A method 700 for reporting type 2 power headroom of a terminal device starts at block 701. At block 701, the terminal device determines whether at least one logical channel supports simultaneous PUCCH and PUSCH transmission. Then, the terminal device reports type 2 power headroom of the terminal device based on said determining (701). As an embodiment, if at least one logical channel supports simultaneous PUCCH and PUSCH transmission, the terminal device reports type 2 power headroom of a terminal device at block 702a. If at least one logical channel does not support simultaneous PUCCH and PUSCH transmission, the terminal device does not report type 2 power headroom of a terminal device at block 702b.

In an example, simultaneous PUCCH and PUSCH transmission can be further configured to have a corresponding configuration according to a method implemented by a network device shown in FIG. 2.

Figure 8:
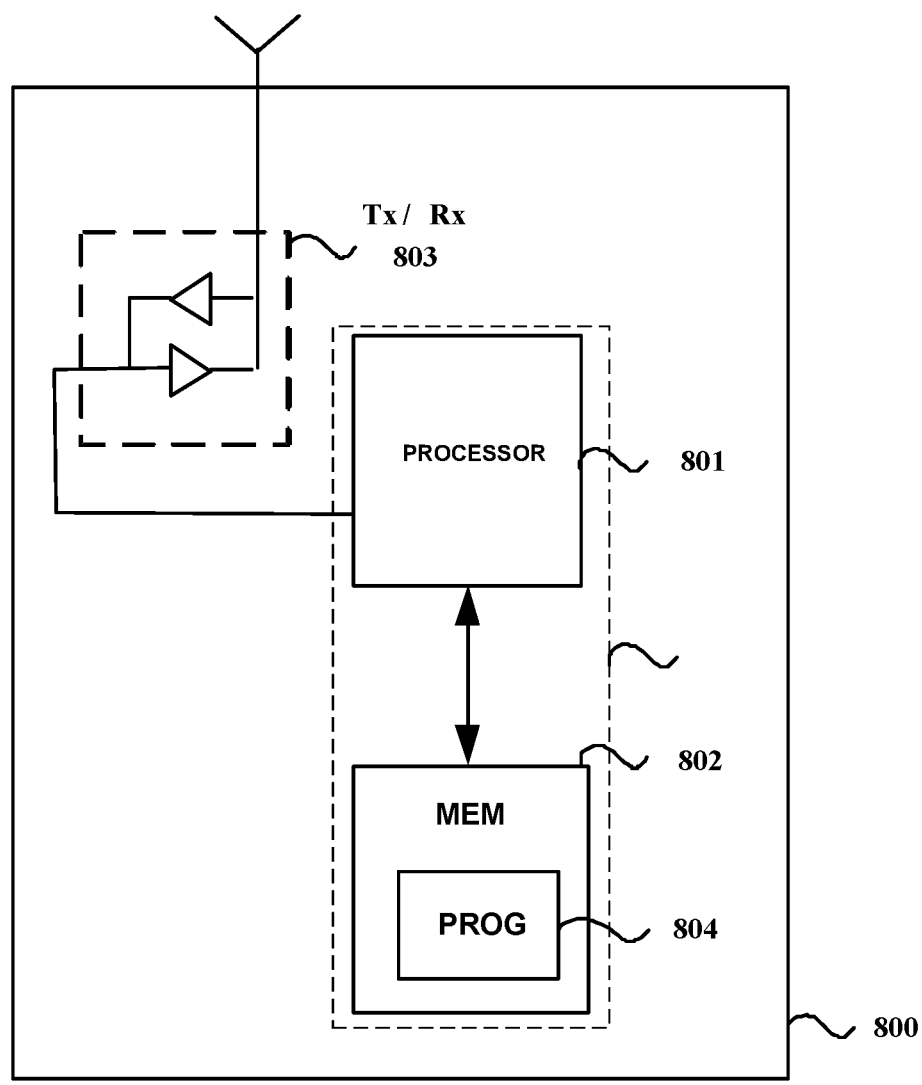
FIG. 8 illustrates a block diagram of a terminal device 800 in accordance with embodiments of the present disclosure.

FIG. 8 illustrates a block diagram of a terminal device 800 in accordance with embodiments of the present disclosure. The terminal device 800 is to report type 2 power headroom. In additional to Tx/Rx 803, the terminal device 800 also comprises a processor 801; a memory 802 communicatively coupled to the processor 801 and adapted to store instructions or program 804 which, when executed by the processor 801, cause the terminal device 800 to perform operations of said method 700 for reporting type 2 power headroom of a terminal device.

In an example, simultaneous PUCCH and PUSCH transmission can be further configured to have a corresponding configuration according to a method implemented by a network device shown in FIG. 2.

The disclosure also relates to a method implemented in a communication system, in accordance with one embodiment. The communication system includes a host computer, a network device and a terminal device which may be those described with reference to FIGS. 4 and 5.

Figures 9, 10:
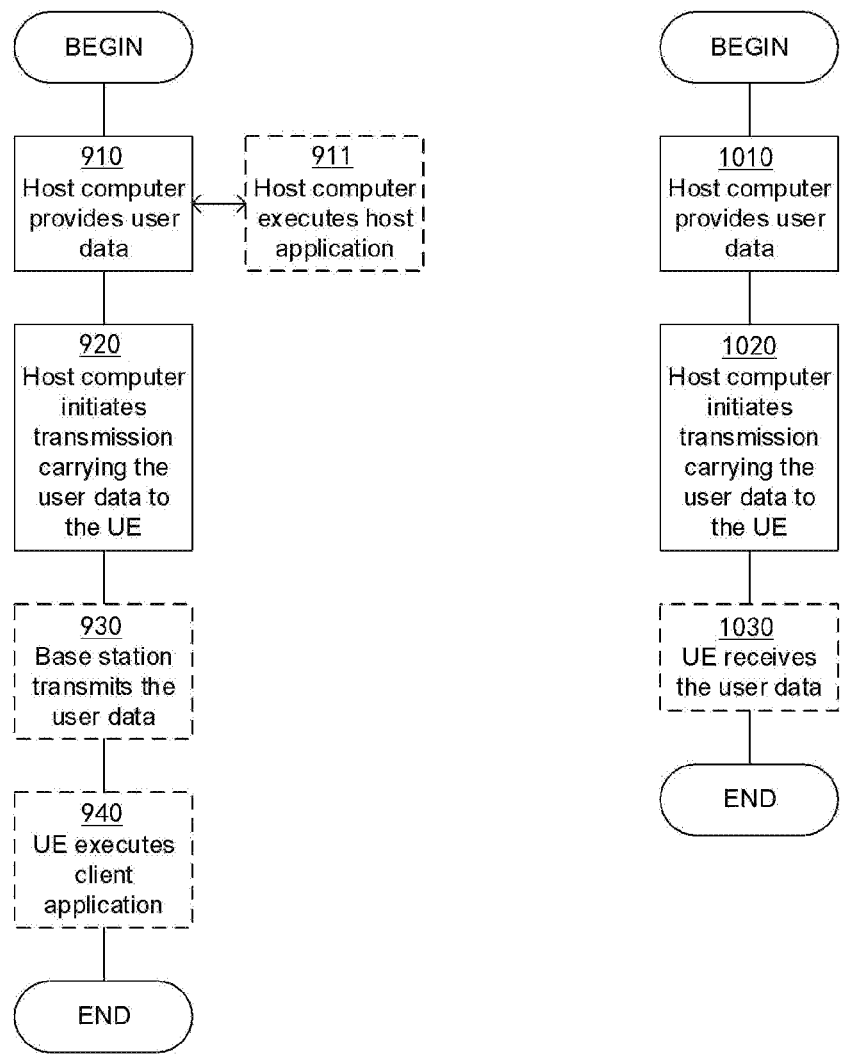
FIG. 9 is a flowchart illustrating a method implemented in a communication system in accordance with one embodiment.
FIG. 10 is a flowchart illustrating a method implemented in a communication system in accordance with one embodiment.

For simplicity of the present disclosure, only drawing references to FIG. 9 will be included in this section and a base station is as an example of the network device and a UE is as an example of the terminal device. In a first block 910 of the method, the host computer provides user data. In an optional sub-block 911 of the first block 910, the host computer provides the user data by executing a host application. In a second block 920, the host computer initiates a transmission carrying the user data to the UE. In an optional third block 930, the base station transmits to the UE the user data which was carried in the transmission that the host computer initiated, in accordance with the teachings of the embodiments described throughout this disclosure. In an optional fourth block 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 10 will be included in this section. In a first block 1010 of the method, the host computer provides user data. In an optional sub-block (not shown) the host computer provides the user data by executing a host application. In a second block 1020, the host computer initiates a transmission carrying the user data to the UE. The transmission may pass via the base station, in accordance with the teachings of the embodiments described throughout this disclosure. In an optional third block 1030, the UE receives the user data carried in the transmission.

FIG. 11 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 11 will be included in this section. In an optional first block 1110 of the method, the UE receives input data provided by the host computer. Additionally or alternatively, in an optional second block 1120, the UE provides user data. In an optional sub-block 1121 of the second block 1120, the UE provides the user data by executing a client application. In a further optional sub-block 1111 of the first block 1110, the UE executes a client application which provides the user data in reaction to the received input data provided by the host computer. In providing the user data, the executed client application may further consider user input received from the user. Regardless of the specific manner in which the user data was provided, the UE initiates, in an optional third sub-block 1130, transmission of the user data to the host computer. In a fourth block 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 12 will be included in this section. In an optional first block 1210 of the method, in accordance with the teachings of the embodiments described throughout this disclosure, the base station receives user data from the UE. In an optional second block 1220, the base station initiates transmission of the received user data to the host computer. In a third block 1230, the host computer receives the user data carried in the transmission initiated by the base station.

According to the above description, the radio resource efficiency can be improved and UCI delay/reliability for different services can be differentiated compared to prior art.

Some portions of the foregoing detailed description have been presented in terms of algorithms and symbolic representations of transactions on data bits within a computer memory. These algorithmic descriptions and representations are ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing detailed description, embodiments of the present disclosure have been described with reference to specific exemplary embodiments thereof. It will be evident that various modifications may be made thereto without departing from the spirit and scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the spirit and scope of the present disclosure as set forth in the following claims.

In the above description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that the disclosure may be practiced without such specific details. In other instances, control structures, gate level circuits and full software instruction sequences have not been shown in detail in order not to obscure the disclosure. Those of ordinary skill in the art, with the included descriptions, will be able to implement appropriate functionality without undue experimentation.

While examples are described with reference to machine type devices, the techniques presented herein may be applied to any type of delay tolerant devices and, more generally, to any type of device.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An embodiment of the disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present disclosure have been presented through flow diagrams. It will be appreciated that the order of transactions and transactions described in these flow diagrams are only intended for illustrative purposes and not intended as a limitation of the present disclosure. One having ordinary skill in the art would recognize that variations can be made to the flow diagrams without departing from the broader spirit and scope of the disclosure as set forth in the following claims.

The invention claimed is:

1. A method implemented by a network device in a wireless communication network, the network device communicatively connected to at least a terminal device in the wireless communication network, the method comprises:
   determining a corresponding configuration for simultaneous Physical Uplink Control Channel (PUCCH) and Physical Uplink Shared Channel (PUSCH) transmission based on information associated with the terminal device,
   wherein the information associated with the terminal device comprises a carrier used by the terminal device, wherein the corresponding configuration for the simultaneous PUCCH and PUSCH transmission based on the information associated with the terminal device configures the simultaneous PUCCH and PUSCH transmission for the carrier, and wherein when different services of the terminal device use different carriers, the simultaneous PUCCH and PUSCH transmission is enabled for one of the different carriers and disabled for another of the different carriers, and
   wherein the information associated with the terminal device further comprises a bandwidth part in a carrier used by the terminal device, wherein the corresponding configuration for the simultaneous PUCCH and PUSCH transmission based on the information associated with the terminal device configures the simultaneous PUCCH and PUSCH transmission for the bandwidth part in the carrier, and wherein when different services of the terminal device use different bandwidth parts in the carrier, the simultaneous PUCCH and PUSCH transmission is enabled for one of the different bandwidth parts in the carrier and disabled for another of the different bandwidth parts in the carrier; and transmitting a configuration signaling to the terminal device, wherein the configuration signaling carries the corresponding configuration for the simultaneous PUCCH and PUSCH transmission and the configuration signaling is to be used to enable or disable the simultaneous PUCCH and PUSCH transmission.

2. The method of claim 1, wherein information associated with the terminal device can be one or more of the information of a service of the terminal device, a logical channel or a logical channel group, a PUCCH cell, a PUCCH resource, a frequency.

3. The method of claim 2, wherein when information associated with the terminal device is a service of the terminal device, determining the corresponding configuration for simultaneous PUCCH and PUSCH transmission based on information associated with the terminal device comprises:

adding an indicator to a signaling structure for simultaneous PUCCH and PUSCH transmission; wherein said indicator is indicative of simultaneous PUCCH and PUSCH transmission for said service of the terminal device.

4. The method of claim 2, wherein when information associated with the terminal device is a logical channel or a logical channel group, determining the corresponding configuration for simultaneous PUCCH and PUSCH transmission based on information associated with the terminal device comprises:

adding an indicator to a signaling structure for logical channel configuration, wherein said indicator is indicative of simultaneous PUCCH and PUSCH transmission for the logical channel or the logical channel group; or adding a bitmap to a signaling structure for simultaneous PUCCH and PUSCH transmission; wherein said bitmap is used to indicate which logical channel(s) or logical channel group is configured to use simultaneous PUCCH and PUSCH transmission; or adding an indicator to a signaling structure for Medial Access Control Element MAC CE; wherein said indicator is used to indicate which logical channel(s) is configured to use simultaneous PUCCH and PUSCH transmission.

5. The method of claim 4, wherein size of said bitmap depends on the number of logical channels configured at maximum for the terminal device.

6. A network device, the network device comprises:
a processor; and
a memory communicatively coupled to the processor and adapted to store instructions which, when executed by the processor, cause the network device to perform a method of claim 1.

7. A method implemented by a terminal device in a wireless communication network, the terminal device communicatively connected to at least a network device in the wireless communication network, the method comprises:

receiving a configuration signaling, wherein the configuration signaling carries a corresponding configuration for simultaneous Physical Uplink Control Channel (PUCCH) and (Physical Uplink Shared Channel) PUSCH transmission; and enabling or disabling the simultaneous PUCCH and PUSCH transmission according to the corresponding configuration, wherein the corresponding configuration is determined based on information associated with the terminal device, wherein the information associated with the terminal device comprises a carrier used by the terminal device, wherein the corresponding configuration for the simultaneous PUCCH and PUSCH transmission based on the information associated with the terminal device configures the simultaneous PUCCH and PUSCH transmission for the carrier, and wherein when different services of the terminal device use different carriers, the simultaneous PUCCH and PUSCH transmission is enabled for one of the different carriers and disabled for another of the different carriers, and wherein the information associated with the terminal device further comprises a bandwidth part in a carrier used by the terminal device, wherein the corresponding configuration for the simultaneous PUCCH and PUSCH transmission based on the information associated with the terminal device configures the simultaneous PUCCH and PUSCH transmission for the bandwidth part in the carrier, and wherein when different services of the terminal device use different bandwidth parts in the carrier, the simultaneous PUCCH and PUSCH transmission is enabled for one of the different bandwidth parts in the carrier and disabled for another of the different bandwidth parts in the carrier.

8. The method of claim 7, wherein information associated with the terminal device can be one or more of the information of a service of the terminal device, a logical channel or a logical channel group, a PUCCH cell, a PUCCH resource, a frequency.

9. The method of claim 7, wherein when information associated with the terminal device is a service of the terminal device, the corresponding configuration comprises adding an indicator to a signaling structure for simultaneous PUCCH and PUSCH transmission; wherein said indicator is indicative of simultaneous PUCCH and PUSCH transmission for said service of the terminal device.

10. The method of claim 7, wherein when information associated with the terminal device is a logical channel or a logical channel group, the corresponding configuration comprises:

adding an indicator to a signaling structure for logical channel configuration, wherein said indicator is indicative of simultaneous PUCCH and PUSCH transmission for the logical channel or the logical channel group; or adding a bitmap to a signaling structure for simultaneous PUCCH and PUSCH transmission; wherein said bitmap is used to indicate which logical channel(s) or logical channel group is configured to use simultaneous PUCCH and PUSCH transmission; or adding an indicator to a signaling structure for Medial Access Control Element MAC CE; wherein said indicator is used to indicate which logical channel(s) is configured to use simultaneous PUCCH and PUSCH transmission.

11. The method of claim 10, wherein size of said bitmap depends on the number of logical channels configured at maximum for the terminal device.

12. A terminal device, the terminal device comprises:
a processor; and
a memory communicatively coupled to the processor and adapted to store instructions which, when executed by the processor, cause the terminal device to perform a method of claim 7.

\* \* \* \* \*